US006571486B1

(12) United States Patent
Tondorf et al.

(10) Patent No.: US 6,571,486 B1
(45) Date of Patent: Jun. 3, 2003

(54) LINEAR MEASURING DEVICE

(75) Inventors: Sebastian Tondorf, Waging (DE);
Peter Pechak, Stein/Traun (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/448,784

(22) Filed: Nov. 24, 1999

(30) Foreign Application Priority Data

Nov. 25, 1998 (DE) .......................................... 198 54 318

(51) Int. Cl.$^7$ ................................................. G01B 5/00
(52) U.S. Cl. ....................................................... 33/706
(58) Field of Search ........................ 33/701, 706, 707, 33/708, 712, DIG. 1, 710

(56) References Cited

U.S. PATENT DOCUMENTS

| 3,629,945 | A | * | 12/1971 | Liuzzo et al. ................. 33/488 |
| 4,152,837 | A | * | 5/1979 | Nelle et al. .................... 33/706 |
| 4,444,504 | A | * | 4/1984 | Takizawa ....................... 33/701 |
| 4,492,032 | A | * | 1/1985 | Nelle ............................ 33/706 |
| 4,530,157 | A | * | 7/1985 | Nelle ............................ 33/706 |
| 4,603,480 | A |   | 8/1986 | Sakagami |
| 4,633,592 | A | * | 1/1987 | Wahli ........................... 33/493 |
| 4,759,132 | A | * | 7/1988 | Giacomello .................... 33/706 |
| 4,776,098 | A | * | 10/1988 | Nelle ............................ 33/706 |
| 5,014,438 | A | * | 5/1991 | Gravel .......................... 33/494 |
| 5,065,525 | A | * | 11/1991 | Szenger ......................... 33/702 |
| 5,148,612 | A | * | 9/1992 | Walser et al. ............. 33/DIG. 1 |
| 5,430,950 | A | * | 7/1995 | Beckwith, Jr. ................ 33/567 |
| 5,711,084 | A |   | 1/1998 | Spanner et al. |
| 5,979,238 | A | * | 11/1999 | Boege et al. .................. 33/755 |

FOREIGN PATENT DOCUMENTS

| DE | 44 35 151 |   | 4/1996 |   |
| EP | 0 264 801 |   | 4/1988 |   |
| EP | 0 387 488 |   | 9/1990 |   |
| GB | 2160977 | * | 1/1986 | .................. 33/707 |

* cited by examiner

Primary Examiner—Randy W. Gibson
(74) Attorney, Agent, or Firm—Kenyon & Kenyon

(57) ABSTRACT

A linear measuring device having a mounting fixture (1), in which a scale (2) is supported is described. Scale (2) is coupled to the mounting fixture (1) in one plane (N1) of the mounting fixture (1), which contains the neutral axis (N) of the mounting fixture (1) and which runs in parallel with the surface of the scale (2) bearing the graduation scale (3). This arrangement reduces perturbations transmitted to scale (2).

20 Claims, 5 Drawing Sheets

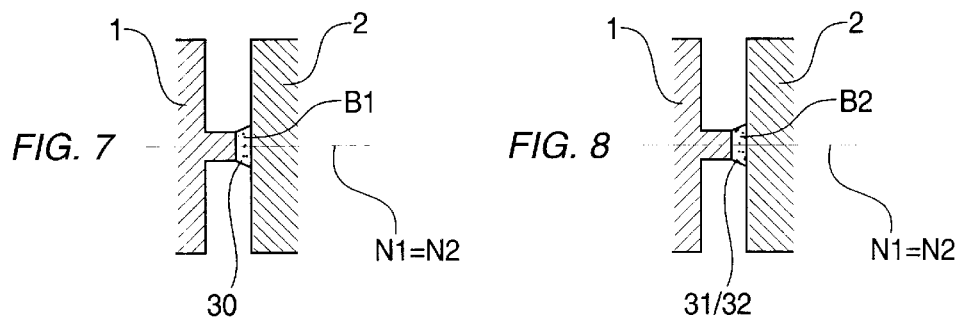
FIG. 7
FIG. 8
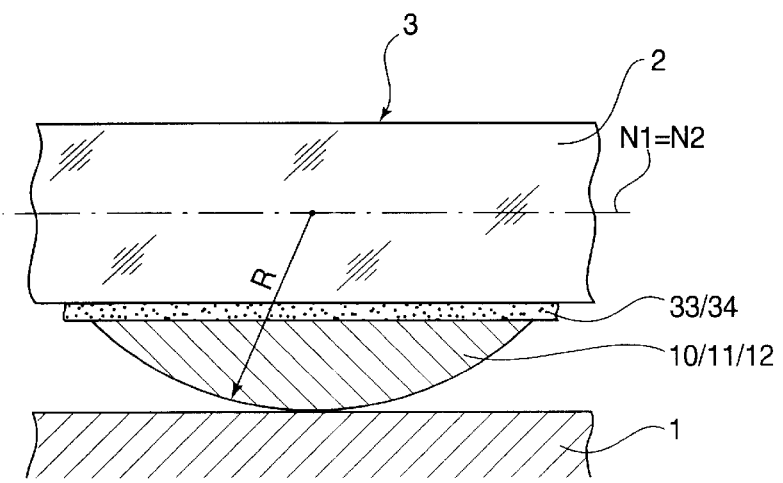
FIG. 9
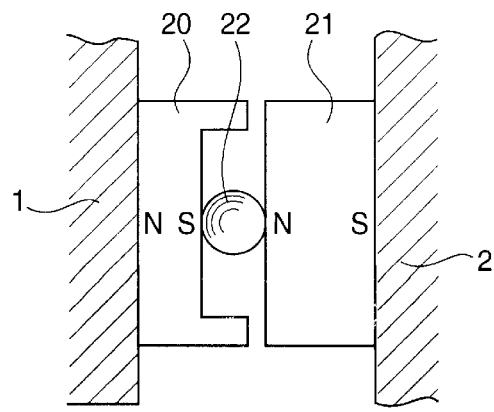
FIG. 10

LINEAR MEASURING DEVICE

The present invention relates to a linear measuring device having a scale that is uncoupled from its mounting fixture, in particular, the scale can move relative to the mounting fixture so that deformations of the mounting fixture are not transmitted to the scale.

DESCRIPTION OF RELATED ART

A linear measuring device is described in the European Patent 0 264 801 B1. To avoid scale deformations caused by forces resulting from the different thermal linear expansion of the scale and of its mounting fixture, and from the manner in which the scale is mounted, the scale is supported at its Bessel points. This mounting arrangement is implemented by a ball bearing arrangement where the balls are retained so as to permit rolling motion, and by a lateral longitudinal guidance using other balls. One of these other balls fixes the scale in place with respect to the mounting fixture in the measuring direction. Springs are provided to maintain the contact pressure between the scale and the balls, as well as between the mounting fixture and the balls.

In the European Patent described, the arrangement does not ensure that the scale is held in its mounting fixture in a manner that is free of constraining forces. The transfer of deformations in the mounting fixture to the scale thus cannot be ruled out.

SUMMARY OF THE INVENTION

The present invention is a linear measuring device with a scale supported in its mounting fixture in a manner that is free of extraneous forces to the greatest possible extent, and which minimizes the influence of deformations in the mounting fixture, and thus improves the measuring accuracy.

In one embodiment, the invention is a linear measuring device that includes a scale, a scale graduation disposed on the scale, and a mount fixture holding the scale, said mount fixture being rigidly coupled to the scale in the measuring direction at a first point, and being movably coupled at additional points in the measuring direction. At least the first point is disposed in a neutral plane of the mount fixture containing a neutral axis of the mount fixture, and the scale graduation is disposed in a second plane of the scale parallel to the neutral plane of the mount fixture.

In the linear measuring device, the scale is uncoupled from its mounting fixture, and is optimally fixed to the mounting fixture, as required. In response to temperature changes, the scale is able to move with respect to its mounting fixture in a manner that is substantially free of forces, so that mounting fixture deformations are not transferred to the scale.

BRIEF DESCRIPTION OF THE DRAWINGS

The invention is explained in greater detail on the basis of the drawings. In the Drawings:

FIG. 7 is a cross-section showing a detail of rigid coupling point B1;

FIG. 8 is a cross-section showing a detail of flexible coupling point B2;

FIG. 9 is side view of a support for scale 2; and

FIG. 10 is a cross-section showing a detail of a ball bearing arrangement.

DETAILED DESCRIPTION OF THE INVENTION

Figure 1:
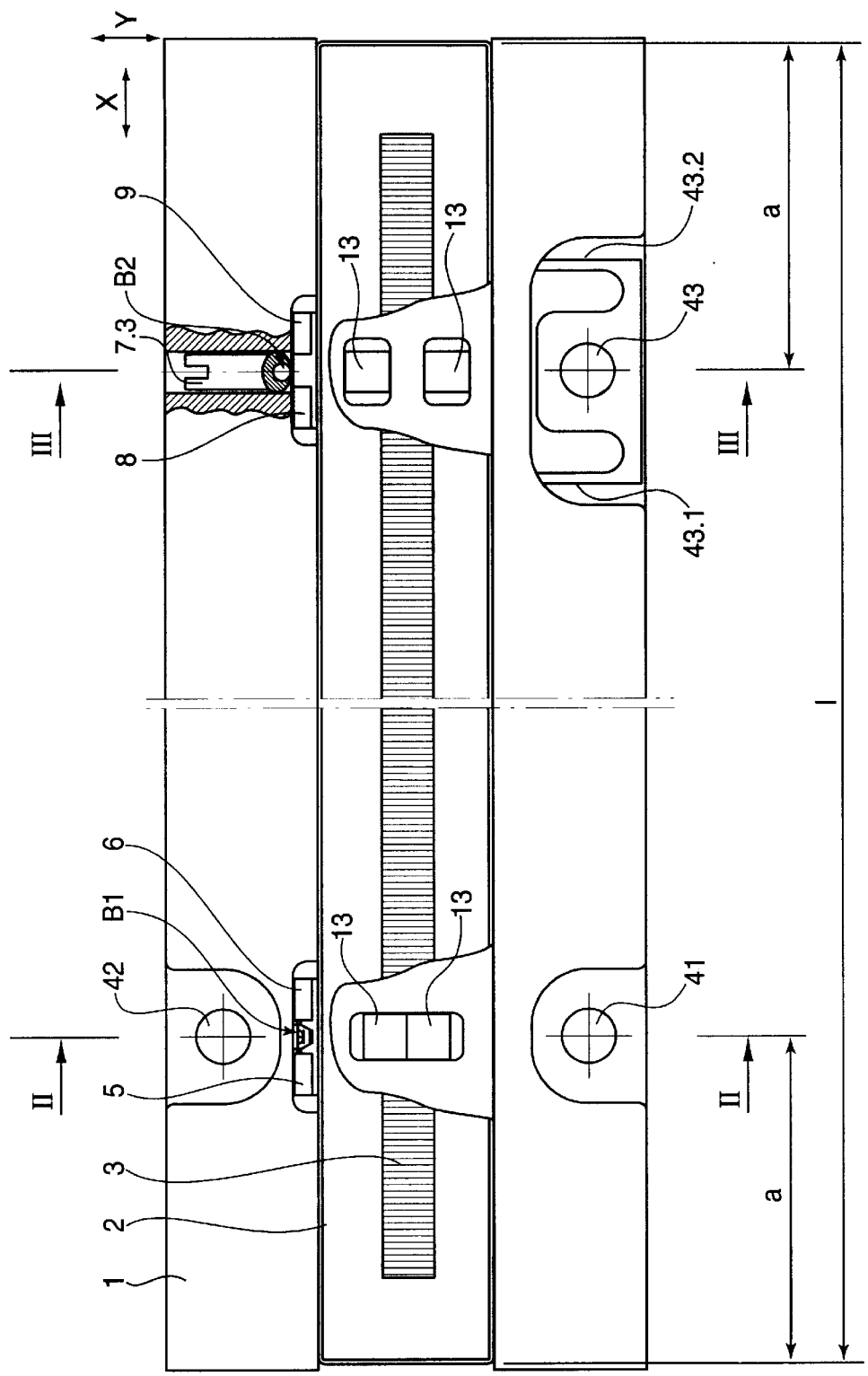
FIG. 1 is a plan view of a linear measuring device according to the invention.
Figure 2:
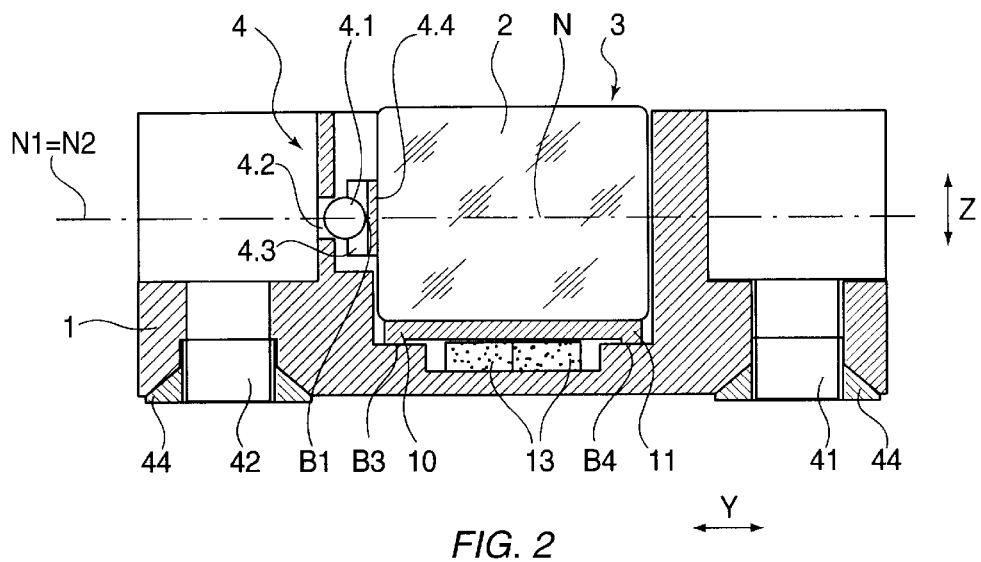
FIG. 2 is a cross-section on line II—II of the linear measuring device in accordance with FIG. 1.
Figure 3:
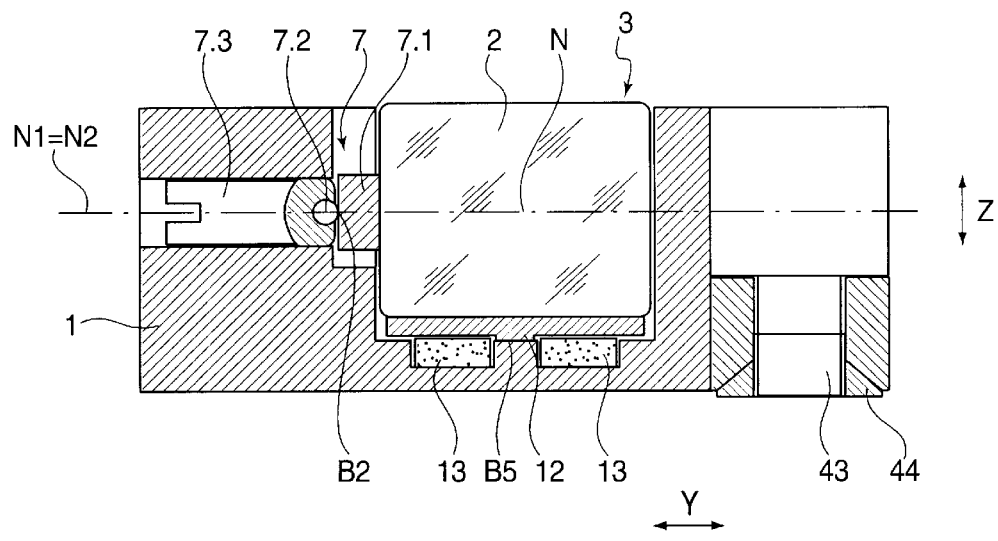
FIG. 3 is a cross-section on line III—III of the linear measuring device in accordance with FIG. 1.
Figure 4:
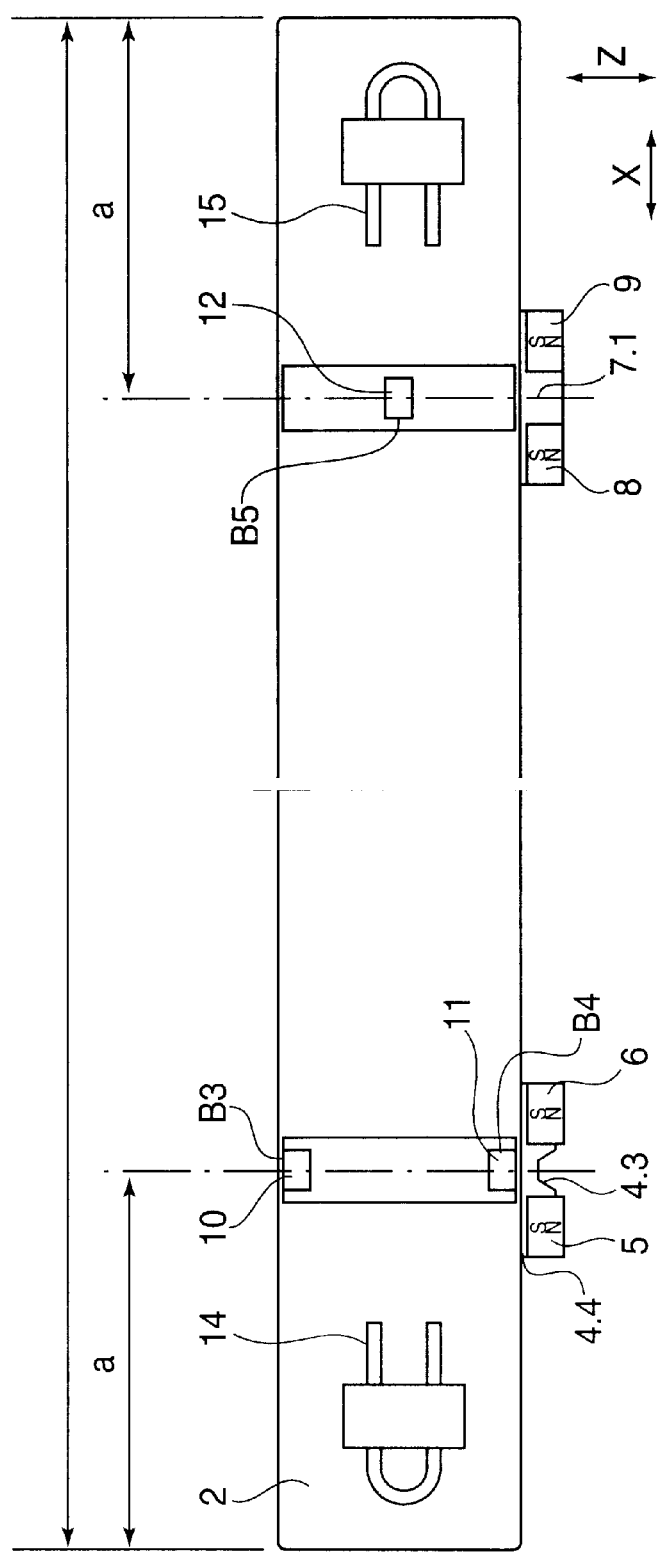
FIG. 4 is a bottom view of the scale of the linear measuring device.
Figure 5:
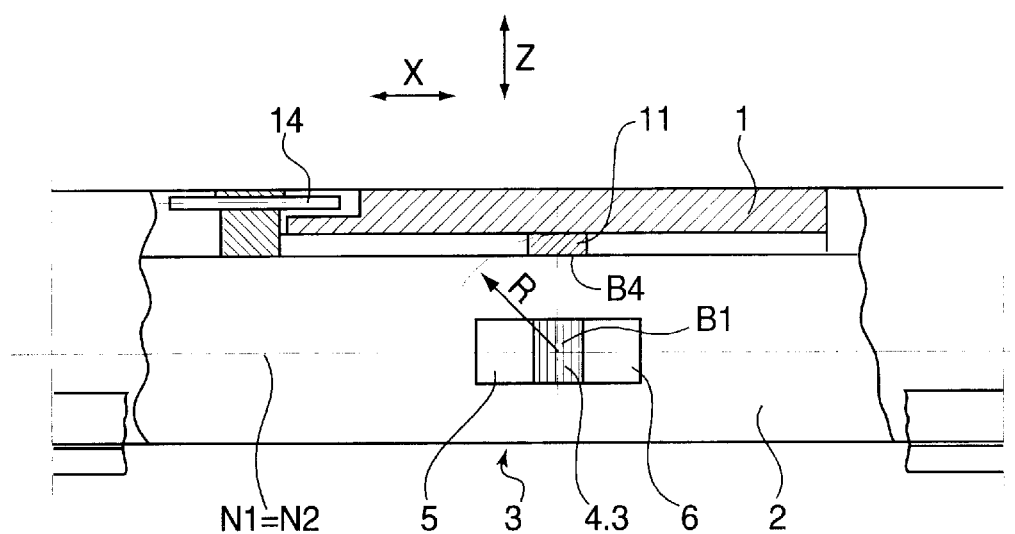
FIG. 5 is a cross-section of the linear measuring device in accordance with FIG. 1, showing area B1 in an enlarged representation.
Figure 6:
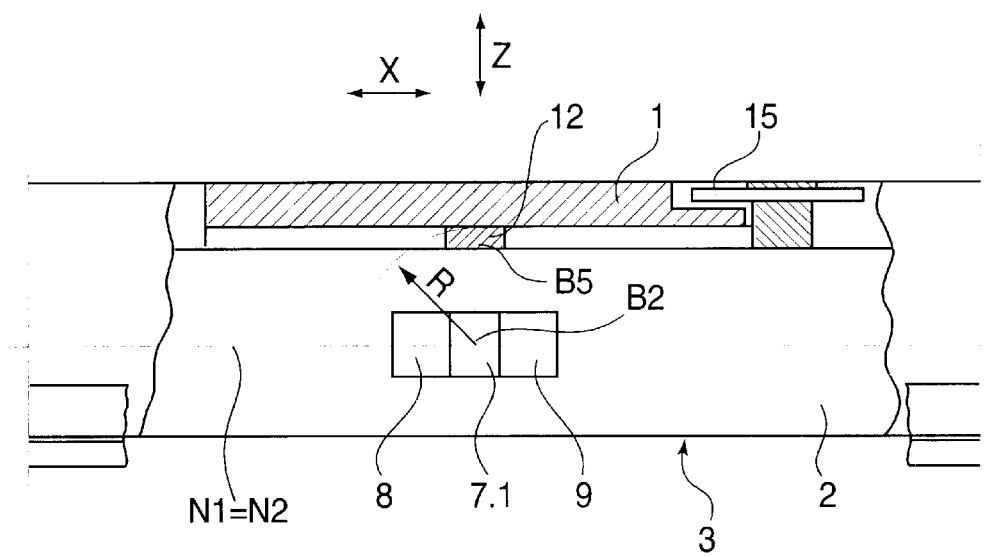
FIG. 6 is a cross-section of the linear measuring device in accordance with FIG. 1, showing area B2 in an enlarged representation.

An exemplary embodiment of the invention is depicted in detail in FIGS. 1 through 6. Scale 2 is held in a mounting fixture 1, and is glass scale preferably made of glass ceramic, having a negligible expansion coefficient. On its top side, scale 2 bears an incremental scale graduation 3 made of a grating having lines with a spacing pitch of, for example, a few nm. Scale graduation 3 is composed of a reflecting phase grating or of reflecting and non-reflecting regions, alternating in measuring direction X. The lines are scanned for purposes of position measuring in the longitudinal direction X of scale 2 by a generally known photoelectric scanning unit, not shown in the drawings.

Scale 2 is rigidly coupled to mounting fixture 1 at a location B1, as viewed in measuring direction X. This rigid fixing point B1 is disposed, as viewed in the Z-direction, in a plane N1 of mounting fixture 1 which runs in parallel to the surface of scale 2. Plane N1 is parallel to the scale graduation plane, and contains neutral axis N of mounting fixture 1. Neutral axis N is the region, or line of a body, which does not undergo any linear change in response to a deformation. Plane N1 is the plane of mounting fixture 1. When a force acts in a direction perpendicular to this plane N1, the force is directed in the Z-direction and, the scale does not undergo any linear deformation in measuring direction X in response to a deformation of mounting fixture 1 in this direction. Therefore, plane N1 is referred to in the following discussion as neutral plane N1.

Fixing point B1 is also situated in a plane N2 of scale 2, which runs in parallel to the surface of scale 2, thus in parallel to the scale graduation plane. Plane N2 contains the neutral axis of scale 2, and is referred to in the following as neutral plane N2.

In a different embodiment, fixed coupling point B1 can be formed by using a stiff adhesive, for which a hard curing adhesive 30 is used, as shown in FIG. 7.

In a preferred embodiment, fixed coupling point B1 is advantageously designed as a ball bearing arrangement 4, as described in the example shown in FIGS. 1 through 6. This ball bearing arrangement 4 is made up of a ball 4.1, a bore 4.2 in mounting fixture 1 for fixing ball 4.1 in position, and a linear guideway for balls 4.1 formed on scale 2. The linear guideway is a prism-shaped hollow recess 4.3 extending in the Z-direction. This hollow recess 4.3 can be formed directly in scale 2, or can be rigidly secured to scale 2 as a separate component 4.4. It is advantageous to form component 4.4 from a material having the same thermal coefficients of expansion as scale 2, in order to avoid distortion due to strain. The coupling at point B1 ensures a rigid coupling in measuring direction X between mounting fixture 1 and scale 2.

Scale 2 is pressed with the aid of magnets 5 and 6 against mounting fixture 1. This ensures that scale 2 is mounted at point B1 in a manner that is free of play to the greatest extent possible, but at the same time is unaffected by constraining forces. Magnets 5, 6 are glued, for example, onto scale 2. To ensure that no leverage is produced by the magnetic force, magnets 5 and 6 are arranged centrosymmetrically to coupling point B1. It is also possible, in a different embodiment, to use only one magnet that is arranged, for example, centrically with respect to ball 4.1.

Scale 2 is pressed against mounting fixture 1 at least at one other location B2, set apart from fixing point B1. At this location B2, scale 2 is secured in a manner that permits sliding movement on mounting fixture 1. An installation of this kind can never be completely frictionless, and so it is necessary to prevent deformation of scale 2 when friction occurs between mounting fixture 1 and scale 2. Supporting point B2 is thus arranged in neutral plane N1 of mounting fixture 1 and at the same time, also in neutral plane N2 of scale 2. N1 and N2 thereby form a common plane.

In the example described, the installation at point B2 can also be formed, for example, as a ball bearing arrangement 7. Ball bearing 7 is formed of a plate 7.1 on scale 2, on which a ball 7.2 can roll. It is advantageous if plate 7.1 is made of a material that has the same coefficient of thermal expansion as scale 2, in order to avoid distortion due to stress. Ball 7.2 is supported in a manner that permits rolling motion in a holder 7.3 of mounting fixture 1. To align scale 2, it is beneficial for ball 7.2 to be adjustable in the Y-direction relative to mounting fixture 1. For this, holder 7.3 is a threaded member that is displaceable in mounting fixture 1 when rotated in the Y-direction.

Scale 2 is pressed by magnets 8 and 9 at point B2 against ball 7.2, and thus is pressed against mounting fixture 1. Magnets 8 and 9 are arranged centrosymmetrically to coupling point B2, so that the force resulting therefrom acts centrically at point B2 and does not exert any leverage. It is also possible to use only one magnet in a different embodiment.

Point of support B2 ensures that mounting fixture 1 is freely displaceable with respect to scale 2 in measuring direction X. In spite of friction occurring at this point of support B2, no leverage, and thus no deformation exerts influence on scale 2, since the friction of supports acts in neutral plane N2 of scale 2.

The mounting of scale 2 at point B2 in a manner that is as friction-free and force-free as possible in measuring direction X can also be implemented by using an adhesive. As an adhesive one can use, for example, an elastic thin adhesive layer 31 extending in measuring direction X, between mounting fixture 1 and scale 2 at point B2 (FIG. 8). In place of adhesive layer 31, a viscous liquid film 32 such as silicon oil can also be used (FIG. 8).

It is also beneficial for the two coupling points B1 and B2 to be located at approximately the Bessel points of scale 2. The distance "a" from the ends of the scale 2 to points B1 and B2 should thus be about 0.22 times the entire length l of the scale 2.

Scale 2 should be as stable and vibration-resistant as possible and counteract the acting forces with the greatest possible resistance. For this reason, scale 2 has a relatively stable and heavy design, necessitating additional supports. These supports are advantageously implemented at two locations, set apart from one another in measuring direction X, and disposed in the vicinity of the Bessel points of scale 2, at a distance of 0.22×l from the ends of scale 2. With this type of support, the bending of scale 2 and the linear deformation in the area of scale graduation 3 are minimized.

The support can be a three-point bearing arrangement. Bearings B3, B4, B5, shown in FIGS. 2 and 3, should support the scale in a manner that is as free of friction and forces as possible, rendering it freely movable in relation to mounting fixture 1 in measuring direction X. Bearings B3, B4, B5, can include, for example, balls capable of rolling motion between mounting fixture 1 and the scale 2, or can include elastic adhesive layers or viscous liquid layers, similar to those described in the variants of FIG. 8. In the illustrated example shown in FIG. 5, provision is made at each of the three respective bearings B3, B4 and B5 for an element 10, 11, 12, which rests on a surface of mounting fixture 1. In the contact area between mounting fixture 1 and elements 10, 11, 12, the elements each have a surface curvature in measuring direction X with a radius R corresponding to the distance between the contact surface and neutral plane N1. In response to a bending deformation of mounting fixture 1, the contact surface moves about radius R due to linear deformation in relation to neutral plane N1, thereby permitting a frictionless roll-away motion.

Bearings B3, B4, B5 can also be designed as longitudinal guideways acting in a frictionless manner in the X-direction. An elastic, adhesive layer 33 or a viscous liquid film 34 is introduced, for example, between the contact surfaces of mounting fixture 1 and of elements 10, 11, 12. In particular, layers 33, 34 can be introduced between the flat surfaces of elements 10, 11, 12 extending parallel to measuring direction X, and scale 2, as shown in FIG. 9. This measure compensates for different linear deformations of scale 2 relative to the mounting fixture, caused by temperature changes, in a frictionless manner. This is advantageous in the case of the illustrated example, since scale 2 and mounting fixture 1 are made of different materials, for example of glass and of steel respectively.

Assigned to each of bearings B3, B4 and B5 is at least one magnet 13, which presses scale 2 against mounting fixture 1. When one single magnet is used per bearing B3, B4 and B5, each magnet is advantageously arranged symmetrically with respect to the respective bearing, so that its magnetic field extends symmetrically with respect to the bearing. In a different embodiment, for each bearing B3, B4, B5, in turn, a plurality of magnets 13 can also be arranged symmetrically with respect to each of bearings B3, B4, B5.

The example described results in an optimum arrangement when scale 2 is made, for example, of glass, and mounting fixture 1 of a material such steel having a coefficient of expansion different from that of glass. The linear guideway that extends in the Z-direction and has the shape of hollow recess 4.3 at point B1 is advantageous since it allows for a simple assembly. When a scale 2 is placed in contact with the linear guideways, it compensates for different thermal linear deformations of scale 2 and of mounting fixture 1 in the Z-direction.

The prism-shaped hollow recess can be replaced by a tapered bore or by a depression in the form of a tetrahedron or a pyramid, design to fix scale 2 in relation to mounting fixture 1 in the Z-direction. If need be, the recess permits a frictionless rotation of scale 2 in relation to mounting fixture 1 at point B1. This degree of freedom with respect to rotation is advantageous since bending deformations of mounting fixture 1 relative to scale 2 produce torsional stress in mounting fixture 1 at coupling point B1, which should not be transferred to scale 2.

If scale 2 and mounting fixture 1 are made of materials having the same coefficient of thermal expansion, on the one hand scale 2 can be rigidly coupled at point B1 in the X-, Y-, and Z-direction. On the other hand, this kind of rigid coupling of scale 2 can also be made at point B2. As a general principle, however, the most friction-free possible rotary motion about an axis of rotation running in the Y-direction should be made at both points B1 and B2. In this manner, slewing motions at coupling points B1 and B2 are also advantageously possible.

During normal operation there is sufficient magnetic force to ensure optimal coupling. However, to prevent scale 2 from falling out of its mounting fixture 1 for example during shipping, a provision is made on scale 2 for limiting stops 14 and 15. These stops do not become effective unless a pre-determine displacement of scale 2 occurs relative to mounting fixture 1. In the normal service position, limit stops 14, 15 do not engage scale 2, and are arranged at a distance on mounting fixture 1. The proper distance is selected to stop movement of scale 2 at a point which ensures that the magnetic force still suffices to enable the coupling described above to adjust itself automatically, even in the case of an extreme displacement of the scale 2 relative to mounting fixture 1.

The magnets of bearings B2 through B5 can also be designed to permit self-centering of balls 22 between magnets 20 and 21. This arrangement is schematically depicted in FIG. 10. Magnets 20 and 21 are arranged one behind another in the acting direction of the desired force, and ball 22 is gripped therebetween in a manner that permits rolling. This gripping action is produced by the attractive force of magnets 20 and 21, and ball 22 is optimally centered by the pattern of the magnetic lines of force. Balls 22 must be made of ferromagnetic material, so that the magnetic flux is concentrated through ball 22 This concentration of the magnetic flux generates the restoring force needed to respond to a decentering of ball 22. A certain restoring force can also be attained when only one of magnets 20 or 21 is provided between ball 22 and mounting fixture 1, or between ball 22 and scale 2.

Mounting fixture 1 has fastening elements 41, 42, 43 having bores, which enable mounting fixture 1 to be rigidly mounted on a machine part to be measured. In particular, the mounting can include screw fasteners. Fastening elements 41, 42, 43 are configured to ensure that mounting fixture 1 is secured at its Bessel points. One of fastening elements 43 is formed, for example, as a linear compensation element, having an area of the bore that is movably articulated in measuring direction X on mounting fixture 1 via two web segments 43.1 and 43.2. To compensate for any irregularities, spherical washers 44 are arranged between mounting fixture 1 and the threaded surface of the machine part. Fastening elements 41, 42, 43 thus constitute a three-point bearing arrangement for scale 2 on mounting fixture 1.

In a different embodiment, mounting fixture 1 can also contain a cover for scale 2, for example in the form of sealing lamellae or in the form of a steel band, not shown in the drawings.

In a preferred embodiment, scale graduation 3 can also be scanned capacitively, inductively, or magnetically. Scale graduation 3 can also be, for example, an incremental or an absolute single- or multi-track code graduation.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A linear measuring device comprising:
   a stable scale;
   a scale graduation disposed on the scale; and
   a mount fixture holding the scale, said mount being rigidly coupled to the scale in a measuring direction at a first point, and being freely movably coupled at at least one additional point in the measuring direction, wherein
   at least the first point is disposed in a neutral plane of the mount fixture containing a neutral axis of the mount fixture, and wherein the scale graduation is disposed in a second plane of the scale parallel to the neutral plane of the mount fixture.

2. The linear measuring device as recited in claim 1, wherein the first point is disposed in a neutral plane of the scale containing a neutral axis of the scale, and the scale graduation is disposed in a plane of the scale parallel to the neutral plane of the scale.

3. A linear measuring device comprising:
   a scale;
   a scale graduation disposed on the scale; and
   a mount fixture holding the scale, said mount being rigidly coupled to the scale in a measuring direction at a first point, and being movably coupled at at least one additional point in the measuring direction, wherein
   at least the first point is disposed in a neutral plane of the mount fixture containing a neutral axis of the mount fixture, and wherein the scale graduation is disposed in a second plane of the scale parallel to the neutral plane of the mount fixture, wherein the first point is disposed away from one end of the scale by at least approximately 0.22 times a length of the scale.

4. The linear measuring device as recited in claim 1, wherein the first and additional points are disposed in the neutral plane of the mount fixture containing the neutral axis of the mount fixture.

5. The linear measuring device as recited in claim 1, wherein the rigid coupling of the first point is a cemented joint.

6. A linear measuring device, comprising:
   a scale;
   a scale graduation disposed on the scale; and
   a mount fixture holding the scale, said mount being rigidly coupled to the scale in a measuring direction at a first point, and being movably coupled at additional points in the measuring direction;
   wherein at least the first point is disposed in a neutral plane of the mount fixture containing a neutral axis of the mount fixture, and wherein the scale graduation is disposed in a second plane of the scale parallel to the neutral plane of the mount fixture; and
   wherein the rigid coupling of the first point comprises a bearing arrangement, and wherein the bearing arrangement, the mount fixture and the scale are urged against one another by magnetic force.

7. The linear measuring device as recited in claim 6, wherein the bearing arrangement comprises a ball bearing with one ball rotatably supported in a hollow recess.

8. The linear measuring device as recited in claim 6, wherein the bearing arrangement comprises a ball bearing having one ball fixed to the mount fixture in the neutral plane and urged against a linear guideway formed on the scale, wherein the linear guideway extends transversely to the measuring direction and transversely to the second plane.

9. The linear measuring device as recited in claim 4, wherein one of an elastic adhesive layer and a viscous liquid film is introduced between the mount fixture and the scale at one of the additional points.

10. A linear measuring device, comprising:

a scale;

a scale graduation disposed on the scale; and a mount fixture holding the scale, said mount being rigidly coupled to the scale in a measuring direction at a first point, and being movably coupled at additional points in the measuring direction;

wherein at least the first point is disposed in a neutral plane of the mount fixture containing a neutral axis of the mount fixture, and wherein the scale graduation is disposed in a second plane of the scale parallel to the neutral plane of the mount fixture;

wherein the first and additional points are disposed in the neutral plane of the mount fixture containing the neutral axis of the mount fixture; and wherein the additional points include a bearing arrangement, wherein the bearing arrangement, the mount fixture and the scale are urged against one another by magnetic force.

11. The linear measuring device as recited in claim 10, wherein the bearing arrangement comprises a ball bearing with one ball movably and rotatably supported on a flat plate.

12. The linear measuring device as recited in claim 4, further comprising means for displacing one of the first and additional points transversely to the measuring direction.

13. The linear measuring device as recited in claim 1, wherein the additional points supporting the scale are arranged in a plane opposite to the scale graduation.

14. A linear measuring device comprising:

a scale;

a scale graduation disposed on the scale; and a mount fixture holding the scale, said mount being rigidly coupled to the scale in a measuring direction at a first point, and being movably coupled at at least one additional point in the measuring direction, wherein at least the first point is disposed in a neutral plane of the mount fixture containing a neutral axis of the mount fixture, and wherein the scale graduation is disposed in a second plane of the scale parallel to the neutral plane of the mount fixture, wherein the additional points supporting the scale are arranged in a plane opposite to the scale graduation wherein each of the additional points are disposed apart from ends of the scale by at least approximately 0.22 times a length of the scale.

15. A linear measuring device, comprising:

a scale;

a scale graduation disposed on the scale; and a mount fixture holding the scale, said mount being rigidly coupled to the scale in a measuring direction at a first point, and being movably coupled at additional points in the measuring direction;

wherein at least the first point is disposed in a neutral plane of the mount fixture containing a neutral axis of the mount fixture, and wherein the scale graduation is disposed in a second plane of the scale parallel to the neutral plane of the mount fixture;

wherein the additional points supporting the scale are arranged in a plane opposite to the scale graduation; and wherein the additional points form a three-point bearing arrangement.

16. A linear measuring device, comprising:

a scale;

a scale graduation disposed on the scale; and a mount fixture holding the scale, said mount being rigidly coupled to the scale in a measuring direction at a first point, and being movably coupled at additional points in the measuring direction;

wherein at least the first point is disposed in a neutral plane of the mount fixture containing a neutral axis of the mount fixture, and wherein the scale graduation is disposed in a second plane of the scale parallel to the neutral plane of the mount fixture;

wherein the additional points supporting the scale are arranged in a plane opposite to the scale graduation; and wherein the additional points are formed as curved elements supporting the scale on the mount fixture.

17. The linear measuring device as recited in claim 16, wherein the scale is urged against the mount fixture at the additional points by magnetic force.

18. The linear measuring device as recited in claim 16, wherein said curved elements comprise a curved surface extending in the measuring direction.

19. The linear measuring device as recited in claim 16, wherein said curved elements comprise a curved surface extending in the measuring direction, the curved surface having a radius of curvature corresponding to a distance between the neutral plane of the mount fixture and a plane of the mount fixture contacting the curved surface of the curved elements.

20. A linear measuring device comprising:

a stable scale;

a scale graduation disposed on the scale; and a mount fixture configured to hold the scale, the mount rigidly coupled to the scale in a measuring direction at a first point and freely movably coupled at additional points in the measuring direction;

wherein at least the first point is disposed in a neutral plane of the mount fixture containing a neutral axis of the mount fixture; and wherein the scale graduation is disposed in a second plane of the scale parallel to the neutral plane of the mount fixture.

* * * * *